United States Patent
Stout et al.

(10) Patent No.: US 12,397,820 B2
(45) Date of Patent: *Aug. 26, 2025

(54) SELF PROPELLED TRAILER SYSTEMS

(71) Applicant: FCA US LLC, Auburn Hills, MI (US)

(72) Inventors: Mark E Stout, Waterford, MI (US);
Brandon Brady, Lapeer, MI (US);
Mac T Lynch, Waterford, MI (US);
Travis D Bechtel, Goodrich, MI (US)

(73) Assignee: FCA US LLC, Auburn Hills, MI (US)

( * ) Notice: Subject to any disclaimer, the term of this patent is extended or adjusted under 35 U.S.C. 154(b) by 169 days.

This patent is subject to a terminal disclaimer.

(21) Appl. No.: 18/190,570

(22) Filed: Mar. 27, 2023

(65) Prior Publication Data

US 2024/0149908 A1 May 9, 2024

Related U.S. Application Data

(60) Provisional application No. 63/423,218, filed on Nov. 7, 2022.

(51) Int. Cl.
*B60W 60/00* (2020.01)
*B60D 1/07* (2006.01)
(Continued)

(52) U.S. Cl.
CPC ............ *B60W 60/001* (2020.02); *B60D 1/07* (2013.01); *B60D 1/245* (2013.01); *B60D 1/249* (2013.01);
(Continued)

(58) Field of Classification Search
CPC ........... B60W 60/001; B60W 60/0015; B60W 10/08; B60W 10/18; B60W 10/20; B60W 50/14; B60W 30/18036; B60W 2300/14; B60W 2420/403; B60W 2420/54; B60W 2520/06; B60W 2520/10; B60W 2520/22; B60W 2520/28; B60W 2552/53; B60W 2556/45; B60W 2710/18; B60W 2710/20; B60W 2720/106; B60W 50/00; B60D 1/07; B60D 1/245; B60D 1/249; B60D 1/32; B60D 1/44; B60D 1/62; B60D 1/248; B60D 1/26; B60D 1/06; B60D 1/145; B60L 50/60; B60L 2200/28; B60R 1/23; B60R 1/26;
(Continued)

(56) References Cited

U.S. PATENT DOCUMENTS

| | | | | |
|---|---|---|---|---|
| 11,712,977 B2 * | 8/2023 | Bucknor | ................ | B60L 53/53 180/2.1 |
| 2010/0252339 A1 * | 10/2010 | Bibeau | ..................... | B60K 6/48 180/11 |

(Continued)

*Primary Examiner* — Hai H Huynh
(74) *Attorney, Agent, or Firm* — Jeremy J. Klobucar

(57) ABSTRACT

A trailer platform system with independent propulsion and control includes a steerable first axle connected to a pair of first wheels, a second axle connected to a pair of second wheels, and at least one electric traction motor configured to drive the steerable first axle and/or the second axle. A high voltage battery system is configured to power the at least one electric traction motor. A load platform is supported by a chassis and a suspension, wherein the load platform is a wagon-style platform with the first and second wheels located at the four corners of the load platform. A lead vehicle hitch connection is configured to removably couple to a lead vehicle.

17 Claims, 5 Drawing Sheets

(51) Int. Cl.
| | |
|---|---|
| B60D 1/24 | (2006.01) |
| B60D 1/32 | (2006.01) |
| B60D 1/44 | (2006.01) |
| B60D 1/62 | (2006.01) |
| B60L 50/60 | (2019.01) |
| B60R 1/23 | (2022.01) |
| B60R 1/26 | (2022.01) |
| B60W 10/08 | (2006.01) |
| B60W 10/18 | (2012.01) |
| B60W 10/20 | (2006.01) |
| B60W 30/09 | (2012.01) |
| B60W 50/14 | (2020.01) |
| B62D 13/00 | (2006.01) |
| B62D 13/06 | (2006.01) |
| B62D 15/02 | (2006.01) |
| B62D 53/08 | (2006.01) |
| B62D 59/04 | (2006.01) |
| G01C 21/34 | (2006.01) |
| G01C 21/36 | (2006.01) |
| G07C 5/02 | (2006.01) |
| G07C 5/08 | (2006.01) |
| B60D 1/26 | (2006.01) |
| B60K 35/00 | (2006.01) |
| B60K 35/10 | (2024.01) |
| B60K 35/28 | (2024.01) |
| B60W 30/18 | (2012.01) |

(52) U.S. Cl.
CPC ............... *B60D 1/32* (2013.01); *B60D 1/44* (2013.01); *B60D 1/62* (2013.01); *B60L 50/60* (2019.02); *B60R 1/23* (2022.01); *B60R 1/26* (2022.01); *B60W 10/08* (2013.01); *B60W 10/18* (2013.01); *B60W 10/20* (2013.01); *B60W 30/09* (2013.01); *B60W 50/14* (2013.01); *B60W 60/0015* (2020.02); *B62D 13/00* (2013.01); *B62D 13/005* (2013.01); *B62D 13/06* (2013.01); *B62D 15/021* (2013.01); *B62D 15/0275* (2013.01); *B62D 53/0864* (2013.01); *B62D 59/04* (2013.01); *G01C 21/3461* (2013.01); *G01C 21/3647* (2013.01); *G07C 5/02* (2013.01); *G07C 5/0825* (2013.01); *B60D 1/248* (2013.01); *B60D 1/26* (2013.01); *B60K 35/00* (2013.01); *B60K 35/10* (2024.01); *B60K 35/28* (2024.01); *B60K 2360/119* (2024.01); *B60K 2360/128* (2024.01); *B60K 2360/167* (2024.01); *B60K 2360/178* (2024.01); *B60L 2200/28* (2013.01); *B60R 2300/105* (2013.01); *B60R 2300/8093* (2013.01); *B60W 30/18036* (2013.01); *B60W 2300/14* (2013.01); *B60W 2420/403* (2013.01); *B60W 2420/54* (2013.01); *B60W 2520/06* (2013.01); *B60W 2520/10* (2013.01); *B60W 2520/22* (2013.01); *B60W 2520/28* (2013.01); *B60W 2552/53* (2020.02); *B60W 2556/45* (2020.02); *B60W 2710/18* (2013.01); *B60W 2710/20* (2013.01); *B60W 2720/106* (2013.01); *B62D 15/029* (2013.01)

(58) Field of Classification Search
CPC ............... B60R 1/00; B60R 2300/105; B60R 2300/8093; B62D 13/00; B62D 13/005; B62D 13/06; B62D 15/021; B62D 15/0275; B62D 15/029; B62D 59/04; G01C 21/3461; G07C 5/02; G07C 5/0825; B60K 35/00; B60K 35/10; B60K 35/28; B60K 2360/119; B60K 2360/128; B60K 2360/167; B60K 2360/178
USPC ............... 701/37, 38, 39, 41, 42, 43, 44, 70
See application file for complete search history.

(56) References Cited

U.S. PATENT DOCUMENTS

| | | |
|---|---|---|
| 2022/0126714 A1 | 4/2022 | Bucknor et al. |
| 2024/0149961 A1* | 5/2024 | Stout .................. B60R 1/26 |

* cited by examiner

SELF PROPELLED TRAILER SYSTEMS

CROSS-REFERENCE TO RELATED APPLICATION

This application claims the benefit of U.S. Provisional Pat. App. No. 63/423,218 filed Nov. 7, 2022, the contents of which are incorporated herein by reference thereto.

FIELD

The present application relates generally to vehicle trailer systems and, more particularly, to self-propelled vehicle trailer systems.

BACKGROUND

Traditional trailer systems allow a vehicle to increase cargo hauling capacity. However, such systems have potential drawbacks. For example, trailer systems typically do not follow the exact path of the lead vehicle, which may increase the possibility of damage to the trailer or surrounding property, particularly during turning maneuvers. Moreover, towing/hitch systems transfer load from the trailer to the rear of lead vehicle, thus requiring the lead vehicle to have a payload carrying capability proportional to the trailer weight. Additionally, the towing/hitch systems can potentially induce undesirable forces to the lead vehicle that can potentially destabilize the forward motion of the lead vehicle (sway) or impart potentially harsh impacts/noises into the lead vehicle chassis under acceleration and deceleration conditions. Further, electric vehicle range associated with towing can be dramatically reduced. Accordingly, while such conventional systems do work well for their intended purpose, there is a desire for improvement in the relevant art.

SUMMARY

In accordance with one example aspect of the invention, a trailer platform system with independent propulsion and control is provided. In one example implementation, the trailer platform system includes a steerable first axle connected to a pair of first wheels, a second axle connected to a pair of second wheels, and at least one electric traction motor configured to drive the steerable first axle and/or the second axle. A high voltage battery system is configured to power the at least one electric traction motor. A load platform is supported by a chassis and a suspension, wherein the load platform is a wagon-style platform with the first and second wheels located at the four corners of the load platform. A lead vehicle hitch connection is configured to removably couple to a lead vehicle.

In addition to the foregoing, the described trailer platform system may include one or more of the following: an advanced driver assistance system (ADAS) or autonomous driving system having a controller in signal communication with a steer-by-wire module to control driving and/or operation of the trailer platform system; and wherein the controller is in signal communication with one or more sensors and/or cameras, and wherein the controller is configured to steer, accelerate, and brake the trailer platform system, based on signals from the one or more sensors and/or cameras, such that the trailer platform system follows a lead vehicle path while avoiding obstacles and providing trailer stability control.

In addition to the foregoing, the described trailer platform system may include one or more of the following: wherein the ADAS or autonomous driving system is configured for signal communication and integration with an ADAS or autonomous driving system of the lead vehicle; wherein the suspension provides a ground force reaction for steering, acceleration, and braking to manage loading and clearance to the lead vehicle; wherein the controller is configured to provide a low-speed manual control mode of the trailer platform system via a control unit; wherein the control unit is a user interface of the lead vehicle; wherein the control unit is a user interface of the trailer platform system; and wherein the control unit is an application on a mobile device.

In addition to the foregoing, the described trailer platform system may include one or more of the following: a high voltage power connection to electrically couple the high voltage battery system to a high voltage battery system of the lead vehicle; a wired connector configured to connect the ADAS or autonomous driving system to an ADAS or autonomous driving system of the lead vehicle for cooperative and integrated operation between the trailer platform system and the lead vehicle; wherein the ADAS or autonomous driving system is wirelessly connected to an ADAS or autonomous driving system of the lead vehicle for cooperative and integrated operation between the trailer platform system and the lead vehicle; and wherein the second axle is a steerable second axle.

In addition to the foregoing, the described trailer platform system may include one or more of the following: a tow bar system to couple the lead vehicle hitch connection to the lead vehicle, the tow bar system including a front tow bar configured to removably couple to a hitch of the lead vehicle, a rear tow bar configured to removably couple to the lead vehicle hitch connection, and a damper system disposed between the front tow bar and the rear tow bar and configured to absorb compressive and tensile loads occurring during steering, accelerating, and braking of the trailer platform system.

In addition to the foregoing, the described trailer platform system may include one or more of the following: wherein the tow bar system further comprises an angle sensor disposed on the front tow bar configured to sense an angle between the lead vehicle and the front tow bar, wherein the angle sensor is in signal communication with an advanced driver assistance system (ADAS) or automated driving system; wherein the tow bar system further comprises an angle sensor disposed on the rear tow bar configured to sense an angle between the load platform and the rear tow bar, wherein the angle sensor is in signal communication with an advanced driver assistance system (ADAS) or automated driving system; and wherein the tow bar system further comprises a load cell configured to sense one or more forces on the tow bar system, wherein the load cell is in signal communication with an advanced driver assistance system (ADAS) or automated driving system.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Described herein is (i) a trailer-supporting dolly system with independent propulsion and control, (ii) a trailer platform system with independent propulsion and control, and (iii) a push-pull tow bar system for independently steered and powered trailers.

Figure 1:
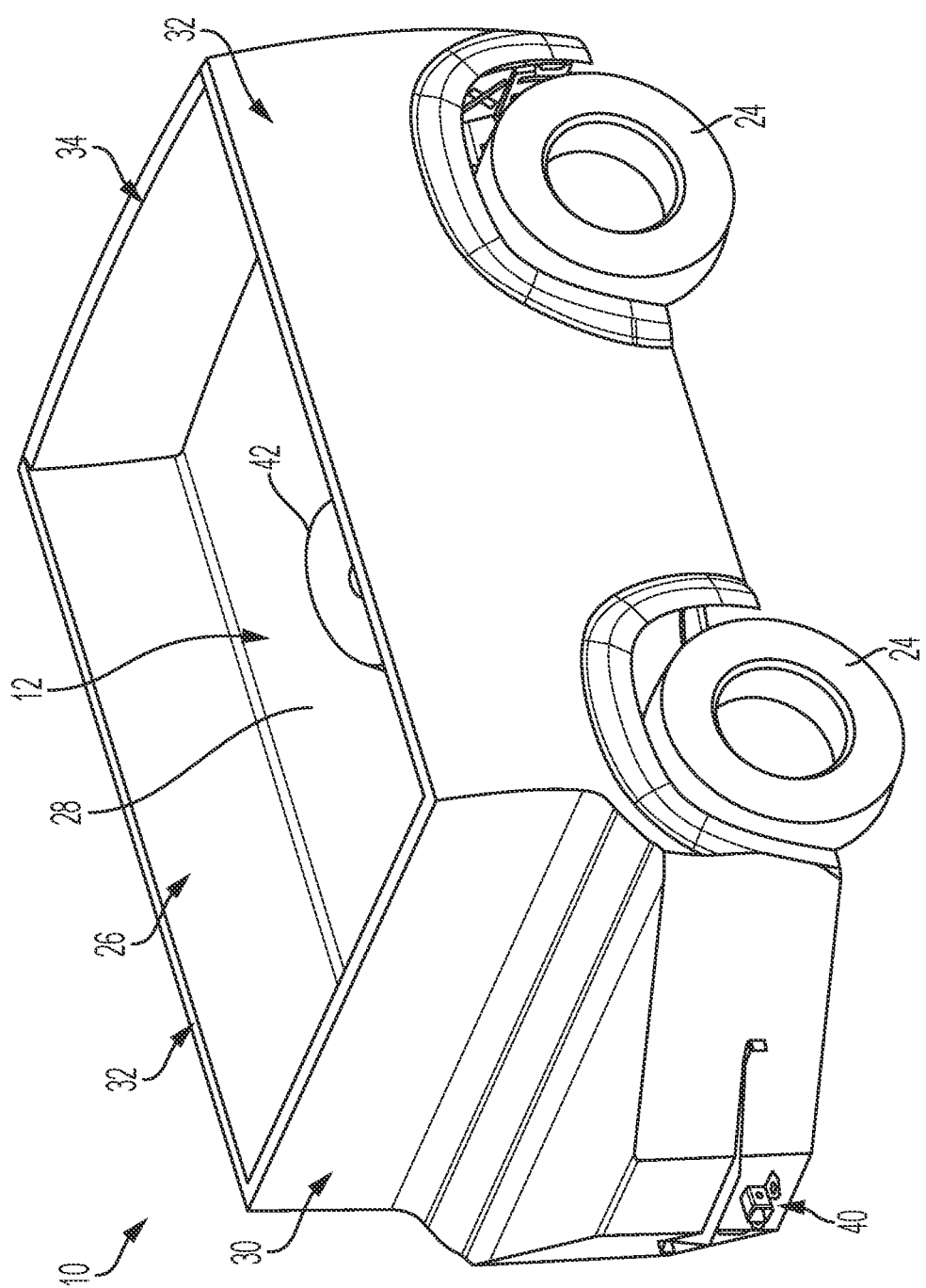
FIG. 1 is a perspective view of an example dolly platform system with independent propulsion and control, in accordance with the principles of the present application.
Figure 2:
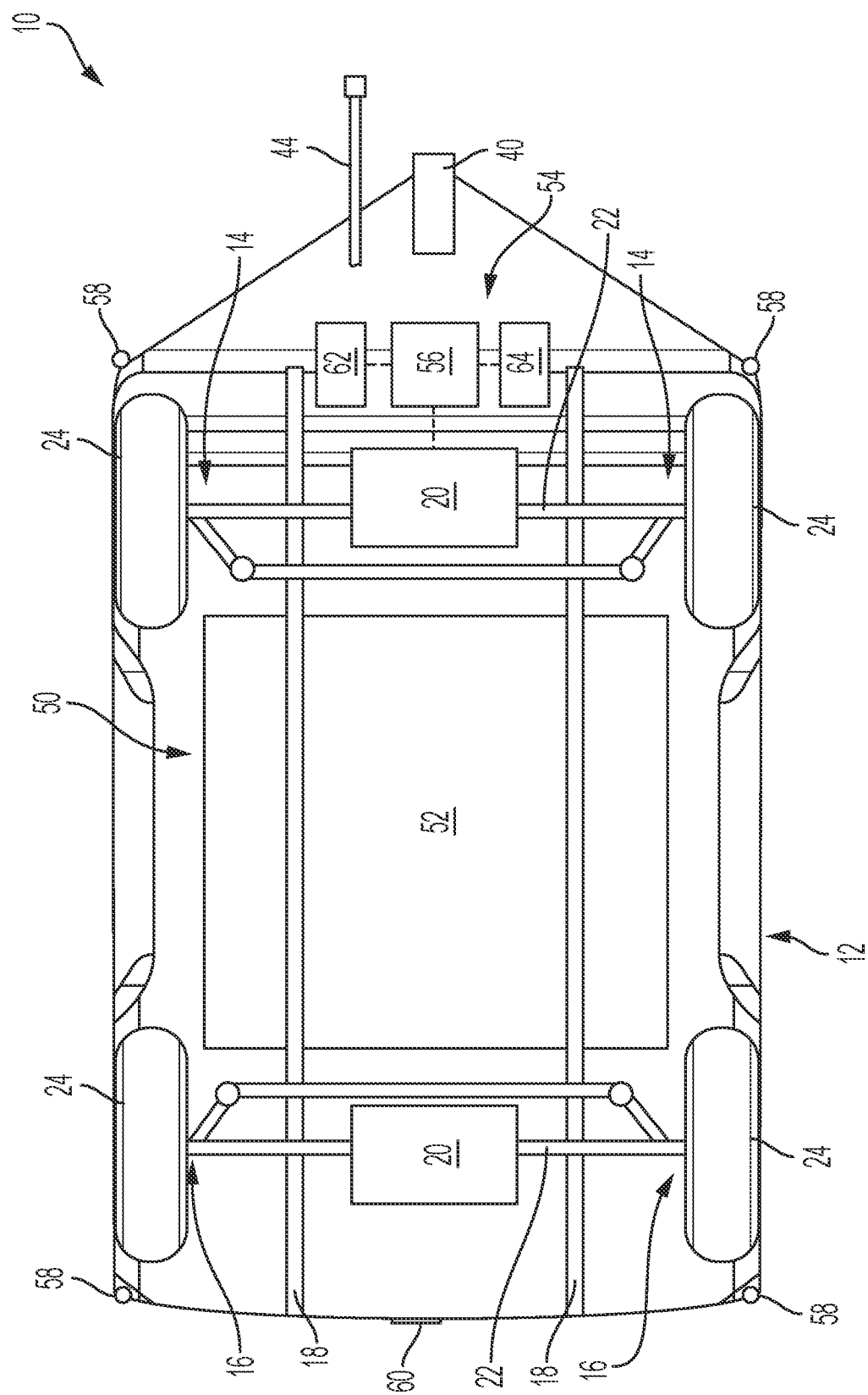
FIG. 2 is a bottom view of the dolly platform system shown in FIG. 1, in accordance with the principles of the present application.

With reference now to FIGS. 1 and 2, the trailer supporting dolly system with independent propulsion and control will be describe in more detail. In some examples, the trailer-supporting dolly system is an auxiliary power dolly that enables small vehicles to tow a trailer such as a gooseneck, fifth wheel, or traditional bumper-pull trailer. The dolly system provides the motive force and energy needed to tow a trailer via an electrified powertrain and batteries. The dolly system attaches to the lead vehicle via a tow bar and supports heavier loads and taller hitch height of a trailer that is specifically designed for trucks with in-bed connections (e.g., fifth wheel, gooseneck). The dolly system functions as a steering axle for the trailer to control its motion via steer-by-wire, and allows separate low-speed remote maneuvering for parking in confined spaces such as parking lots, campgrounds or charging stations.

The dolly system includes suspension (rate and travel) similar to the rear axle of one-ton DRW trucks or enclosed cargo vans. This provides the dolly system with its own ground force reactions for steering, acceleration, and braking to manage loading into the trailer hitch structure similar to "free pivot" designs. The dolly system can also include modular functionality greater than a pickup truck with a bed. For example, the dolly system can include a dump bed with modular side panels that transition between a flat bed and a walled-in bed depending on the cargo. The walled-in bed can include conventional bed sides/walls and a cover for typical truck bed usage. Because the dolly system can be remotely maneuvered at low speeds, the system is highly maneuverable for utility uses such as dumping mulch, collecting/moving firewood, waste/dumpster disposal, etc.

In the example embodiments, the dolly system is configured to support the weight of any type of trailer hitch and acts as an intermediary between the lead vehicle and the trailer. The intermediate body creates backwards compatibility between EVs and older trailers without their own power source. Onboard batteries improve range of the EV/trailer, and allow a smaller lead vehicle to tow a large trailer by handling most or all of the braking and accelerating. The front steering axle pulls the trailer around corners and allows it to accurately follow the lead vehicle path. A low-speed remote maneuvering function allows the trailer to steer into tight spaces with ease. The dolly system's truck bed sides and small size allow users to experience the functionality and utility of a truck only when they need it, allowing them to own a smaller, cheaper, and more fuel efficient vehicle that suits daily use needs.

The dolly system described herein advantageously provides backwards compatibility for EVs to pull older trailers, does not require users to purchase a new trailer in order to maintain towing range, and allows the driver to steer the trailer much more easily than a conventional trailer because of the active steering axle. The system also provides more control than the passive steering axle of an automated safety hitch, and allows a much smaller vehicle to tow/lead the trailer because of the stability of its four-wheeled chassis and electrified powertrain. As such, the dolly system does all the work of braking, accelerating and steering of the trailer, leaving the lead vehicle to simply be a guide.

With continued reference to FIGS. 1 and 2, a trailer-supporting tug/dolly platform system 10 with independent and autonomous propulsion and control is illustrated. The dolly system 10 advantageously provides a non-powered trailer with a powered trailer having autonomous steering capabilities. The dolly system 10 includes a load platform 12 located above and supported by a front suspension 14, a rear suspension 16, and a frame or chassis 18. The dolly system 10 includes an electric powertrain having one or more electric traction motors 20 that generate and transfer torque to one or more steerable axles 22 and wheels 24 via intermediate components (e.g., a transmission, shafts, differential). The electric traction motor(s) 20 are electrically coupled to and powered by a high voltage battery system 50 having one or more battery packs or modules 52, as described herein in more detail.

In one exemplary implementation, the dolly system 10 is similar to a pickup truck bed, as illustrated. The load platform 12 provides a truck bed or cargo area 26 defined at least partially by a floor 28, a forward wall 30, side walls 32, and a tailgate 34. One or more of the forward wall 30, side walls 32, and tailgate 34 may be removable to transition the dolly system 10 into various configurations for towing and/or cargo hauling. Moreover, the load platform 12 may be articulatable to function as a dump bed.

In the example embodiment, the dolly system 10 includes a lead vehicle hitch connection 40, a trailer hitch structure 42, and a high voltage power connection 44. The lead vehicle hitch connection 40 is configured for removable coupling with a lead vehicle (not shown), for example via the tow bar system 200 described herein. The trailer hitch structure 42 is coupled to the floor 28 and configured to removably couple to a trailer (not shown) such as a fifth wheel or gooseneck trailer. The high voltage power connection 44 is configured to electrically couple to a corresponding connection of the lead vehicle (not shown). The high voltage connection 44 is electrically coupled to the battery pack(s) 52 to enable power connection between the dolly system 10 and the lead vehicle. In this way, battery charge can be shared or redirected between the electric dolly system 10 and an electric lead vehicle.

As shown in FIG. 2, the dolly system 10 includes an advanced driver assistance system (ADAS)/autonomous driving system 54 that generally includes a controller 56, one or more sensors 58, one or more cameras 60, a steer-by-wire control module 62, and one or more actuators 64. The controller 56 is configured to control operation of the dolly system 10 as well as execute at least one ADAS/autonomous driving feature. The sensors 58 and cameras 60 are configured to capture/measure data utilized by the ADAS/autonomous driving system 54 to control the dolly system 10. The steer-by-wire control module 62 is configured to operate the actuators 64 to control driving/operation of the dolly system 10 as part of the ADAS/autonomous driving feature. In this way, the controller 56 is configured to control the electric traction motor(s) 20 and the steerable axle(s) 22 and can be configured for autonomous or manual control of the dolly system 10. Moreover, the controller 56 or other components (e.g., sensors 58, cameras 60) of the ADAS/autonomous driving system 54 may be in signal communication with the lead vehicle (e.g., via electrical connection, wireless, CAN bus, lead vehicle ADAS system, etc.) for cooperative and integrated operation between the dolly system 10 and lead vehicle.

In operation, the dolly system 10 provides motive force and power to tow a trailer via an electrified powertrain and HV battery system 50, including independently performing some or all braking and acceleration of the trailer. This reduces or eliminates power demands on the towing vehicle for acceleration and braking, which allows a smaller vehicle to tow a larger trailer, since the dolly system 10 can balance itself and is not dependent on the towing vehicle to carry significant trailer tongue weight. The dolly system 10 supports the heavier loads and taller hitch height of a trailer specifically designed for trucks with in-bed connections. Advantageously, the dolly system 10 includes its own suspension 14, 16 to provide its own ground force reactions for steering, acceleration and braking to manage loading in the trailer hitch structure. Moreover, the ADAS/autonomous driving system 54, including the steer-by-wire control module 62, is utilized to control the steering axle(s) 22 to provide and control its own motion of the attached trailer. Additionally, the dolly system 10 can be controlled (e.g., driven) in a low-speed remote maneuvering mode via a control unit (not shown) such as, for example, a user interface in the towing vehicle, a user interface on the dolly system, a smart phone app, etc. This is particularly useful for parking in tight confines such as parking spaces, charging stations, camping sites, etc.

Figure 3:
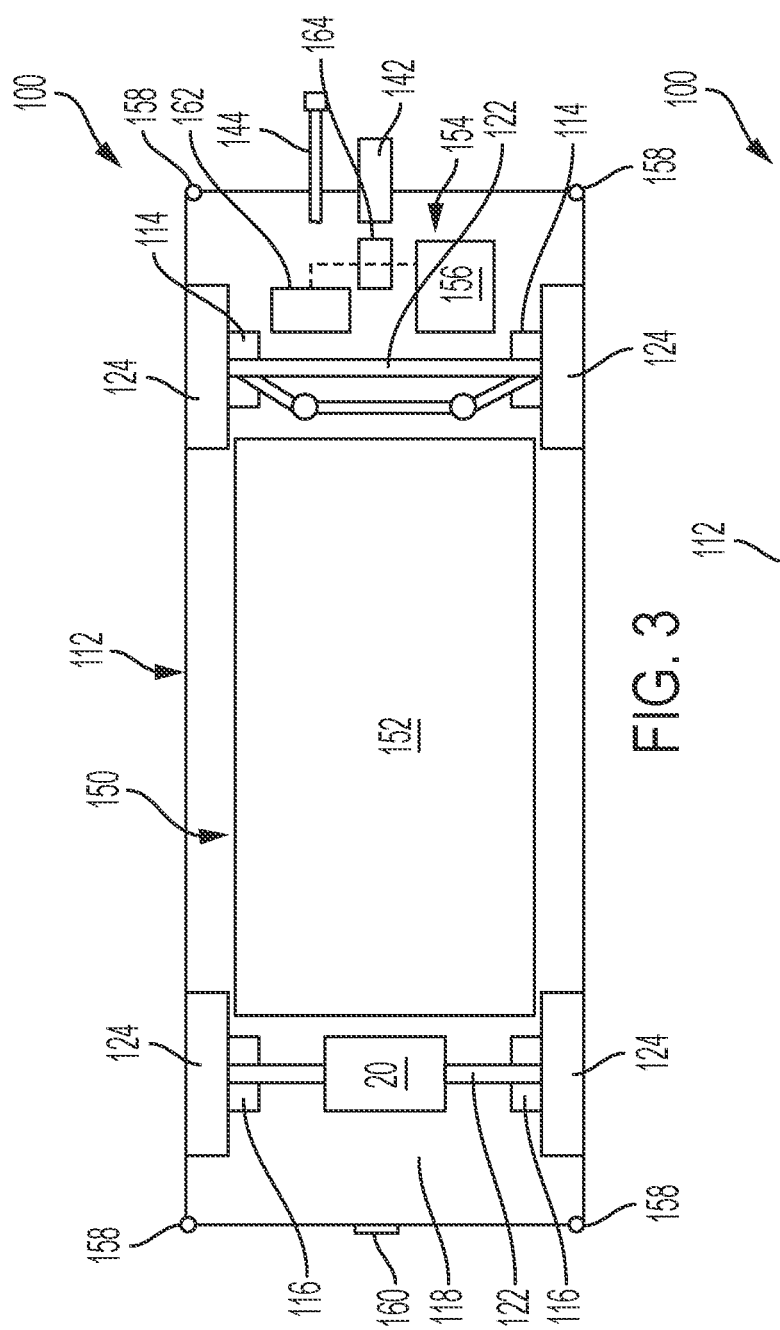
FIG. 3 is a bottom view of an example trailer platform system in accordance with the principles of the present application.
Figure 4:
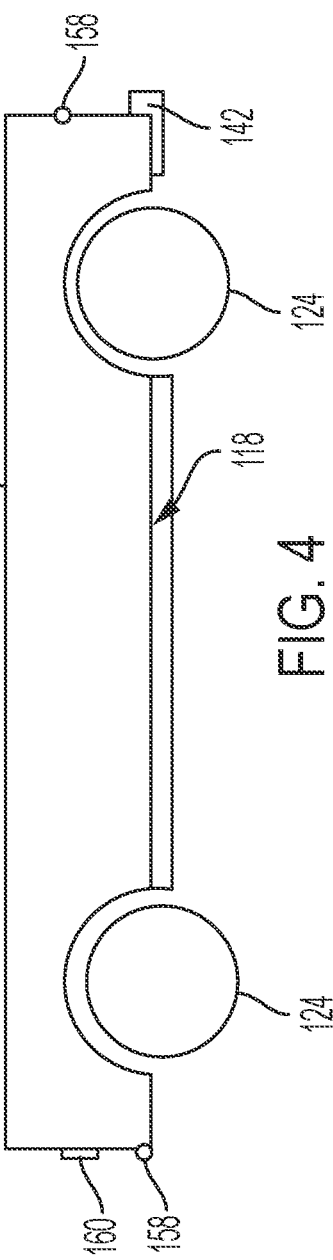
FIG. 4 is a side view of the trailer platform system shown in FIG. 3, in accordance with the principles of the present application.

With reference now to FIGS. 3 and 4, the trailer platform system with independent propulsion and control will be described in more detail. In some examples, the trailer platform system is a self-propelled battery electric vehicle (BEV) based, wagon style (e.g., wheel at four corners) trailer, with autonomous driving control capability. The trailer platform system generally includes a chassis, wheels, tires, suspension, brakes, a battery pack, electric drive motor(s), control modules (e.g., controllers), a steer-by-wire system, camera(s), and/or sensor(s). The system operates by interacting with some or all of the following components on the lead vehicle: vehicle CAN bus, trailer hitch load cell, vehicle dynamics control module(s), and autonomous sensors and ADAS control module(s). The system is also configured to share battery charge between the lead vehicle and the trailer platform.

In the example embodiment, the trailer platform system provides the motive force and energy needed to tow a trailer via an electrified powertrain and batteries. The system attaches to the lead vehicle (e.g., through a wireless or wired connection and a tow bar) and is configured to support its own weight. The trailer includes a steering axle to control its motion via steer-by-wire and allows separate low-speed remote maneuvering. The trailer system includes a suspension (rate and travel) similar to the rear axle of a one-ton DRW truck or enclosed cargo van to provide its own ground force reactions for steering, acceleration and braking, to thereby manage loading and clearance to the lead vehicle. In one example, with a highly autonomous lead vehicle, the lead vehicle can control the trailer remotely to the autonomy level, and associated cost and weight of the trailer can be reduced by eliminating the ADAS sensors and controllers from the trailer.

In some examples, the included battery pack, motor(s), and controller(s) are sized to reduce or eliminate power demands on the lead vehicle for acceleration and braking. The wagon style trailer setup (with wheels at the four corners of the trailer instead of near the middle of the trailer length for traditional towed trailers) will allow a smaller vehicle to tow a larger trailer, since the trailer can balance itself and is not dependent on the lead vehicle to carry significant trailer tongue weight. The dynamic steering and propulsion/braking capability allows the trailer to correct the trailer's path when turning while moving in forward or reverse to follow the lead vehicles intended path more closely than traditional trailers. This can also allow for trailer obstacle avoidance and enhanced trailer stability control.

The trailer platform system advantageously provides autonomous dynamic control (e.g., acceleration, braking, steering) to a trailer, controlled either through self-contained systems or communication with lead vehicle autonomous systems. The wagon-style chassis can be used in light and medium duty trailer categories for on-road use. The actively steered axle allows greater steering control and the ability to reverse as compared to low-speed farm/utility wagons.

With continued reference to FIGS. 3 and 4, a trailer platform system 100 with independent and autonomous propulsion and control is illustrated. The trailer platform system 100 includes a load platform 112 located above and supported by a front suspension 114, a rear suspension 116, and a frame or chassis 118. The trailer platform system 100 includes an electric powertrain having one or more electric traction motors 120 that generate and transfer torque to one or more steerable axles 122 and wheels 124 via intermediate components (e.g., a transmission, shafts, differential). The electric traction motor(s) 120 are electrically coupled to and powered by a high voltage battery system 150 having one or more battery packs or modules 152. As illustrated, in the example embodiment, the wheels 124 are located at the four corners of the trailer instead of near the middle of the trailer length.

In the example embodiment, the trailer platform system 100 includes a lead vehicle hitch connection 142 and a high voltage power connection 144. The hitch connection 142 is coupled to the chassis 118 and is configured for removable coupling with a lead vehicle (not shown), for example via the tow bar system 200 described herein. The high voltage power connection 144 is configured to electrically couple to a corresponding high voltage connection of the lead vehicle (not shown). The high voltage power connection 144 is electrically coupled to the battery pack(s) 152 to enable power connection between the trailer platform system 100 and the lead vehicle. In this way, battery charge can be shared or redirected between the electrically driven trailer platform system 100 and an electric lead vehicle.

As shown in FIG. 3, the trailer platform system 100 includes an advanced driver assistance system (ADAS)/ autonomous driving system 154 that generally includes a controller 156 (e.g., PCM), one or more sensors 158, one or more cameras 160, a steer-by-wire control module 162, and one or more actuators 164. The controller 156 is configured to control operation of the trailer platform system 100 as well as execute at least one ADAS/autonomous driving feature. The sensors 158 and cameras 160 are configured to capture/measure data utilized by the ADAS/autonomous driving system 154 to control the trailer platform system 100. The steer-by-wire control module 162 is configured to operate the actuators 164 to control driving/operation of the trailer platform system 100 as part of the ADAS/autonomous driving feature. In this way, the controller 156 is configured to control the electric motor(s) 120 and the steerable axle(s) 122 and can be configured for autonomous or manual control of the trailer platform system 100. Moreover, the controller 156 or other components (e.g., sensors 158, cameras 160) of the ADAS/autonomous driving system 154 may be in signal communication with the lead vehicle (e.g., via electrical connection, wireless connection, CAN bus, lead vehicle ADAS system, etc.) for cooperative and integrated operation between the trailer platform system 100 and lead vehicle.

In operation, the trailer platform system 100 provides motive force and power to tow a trailer via an electrified powertrain and HV battery system 150, including independently performing some or all braking and acceleration of the trailer. This reduces or eliminates power demands on the towing vehicle for acceleration and braking, which allows a smaller vehicle to tow a larger trailer, since the trailer platform system 100 can balance itself and is not dependent on the towing vehicle to carry significant trailer tongue weight. Advantageously, the trailer platform system 100 includes its own suspension 114, 116 to provide its own ground force reactions for steering, acceleration and braking to manage loading in the trailer hitch structure. Moreover, the ADAS/autonomous driving system 154, including the steer-by-wire control module 162, is utilized to control the steering axle(s) 122 to provide and control its own trailer motion. Additionally, the trailer platform system 100 can be controlled (e.g., driven) in a low-speed remote maneuvering mode via a control unit (not shown) such as, for example, a user interface in the towing vehicle, a user interface on the trailer platform system, a smart phone app, etc. This is particularly useful for parking in tight confines such as parking spaces, charging stations, camping sites, etc.

Figure 5:
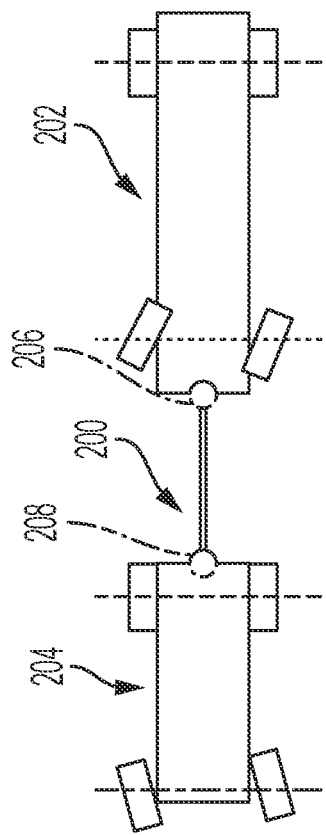
FIG. 5 is a schematic illustration of an example tow bar system connecting a lead vehicle and a trailing vehicle, in accordance with the principles of the present application.
Figure 6:
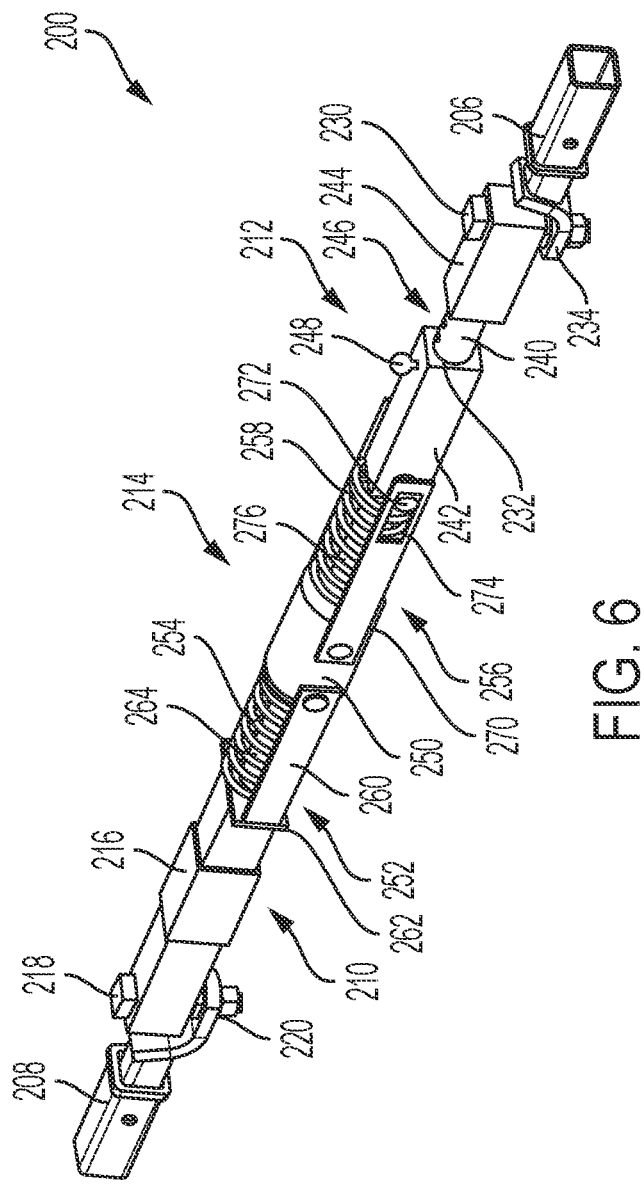
FIG. 6 is a perspective view of the example tow bar system shown in FIG. 5, in accordance with the principles of the present application.
Figure 7:
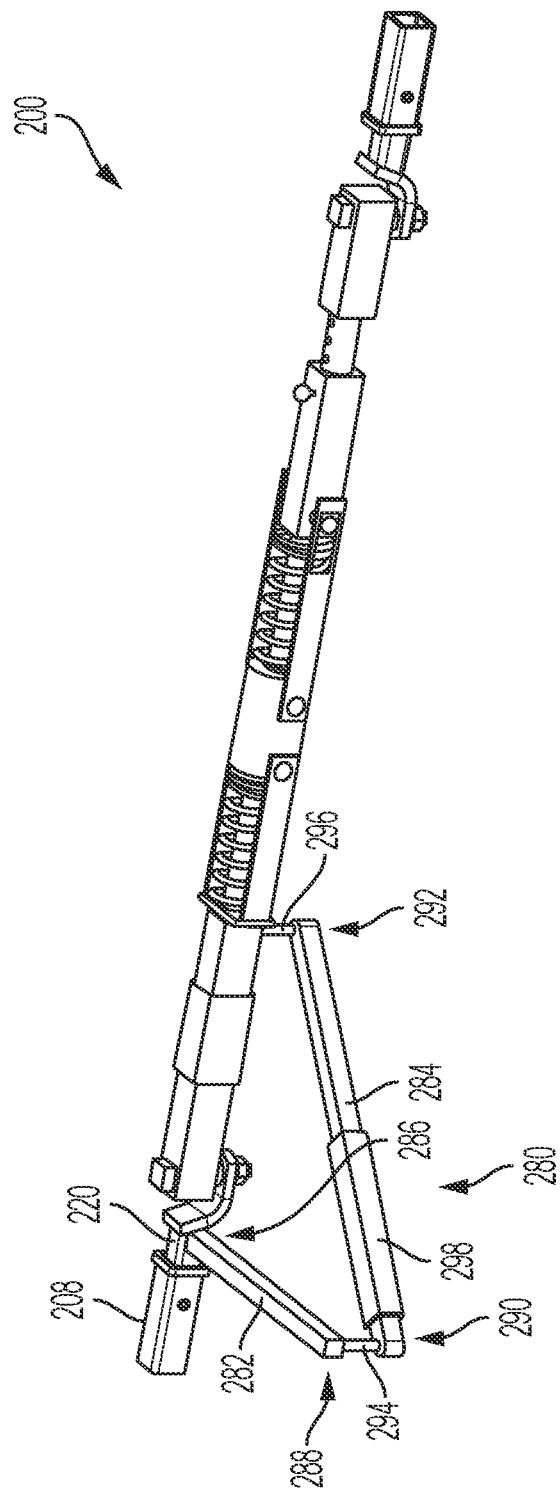
FIG. 7 is a perspective view of the example tow bar system shown in FIG. 6 with an example horizontal lockout assembly, in accordance with the principles of the present application.

With reference now to FIGS. 5-7, the tow bar system will be described in more detail. In some examples, the tow bar system is configured for independently steered and powered trailers and includes: (a) a five degree of freedom connection at both ends of the tow bar to allow articulation between the two vehicles, (b) a means of adjusting the length of the bar between the lead and follow vehicles, (c) a means of locking the adjusted length after the connection has been made between the vehicles, (d) a means to absorb harsh compressive loads that could occur while braking or steering, (e) a means to absorb harsh tensile loads that could occur while accelerating or steering, (f) a means to support and route an electrical cable connection between the lead and follow vehicles, (g) an optional means to sense angular difference between the tow bar and either one or both lead and follow vehicle, (h) a means of sensing tensile and compressive loads in the tow bar, and/or (i) an optional means to lockout the lateral steering degree of freedom at one end of the tow bar. The mechanical assembly is configured to attach between the rear trailer towing connection of the lead vehicle and a front/center towing connection like a typical rear towing connection.

The tow bar system provides a physical linkage between two vehicles that have the independent ability to accelerate and decelerate (fore/aft) via human or autonomous control, and steer laterally via human or autonomous driving control. The system provides additional degrees of freedom as a link between the two vehicles to allow improved articulation between the leading and following vehicles, leaving only a tension/compression load and nominal length constraint. The system does not support vertical loading between the two vehicles, so no weight is transferred therebetween and having a negative effect on the handling of them individually or as a pair. The system also does not transfer lateral moment loading between the vehicles unless a tensile or compressive load is created by a speed differential between the vehicle attachment points. This feature will eliminate any possibility of the following vehicle imparting trailer sway to the lead vehicle, and allow the lead and follow vehicles to maintain an offset within the lane width when it may be advantageous for crosswind drag or visibility in outside lanes. As such, the tow bar system allows vehicles that may be mismatched in terms of turning radius (e.g., due to differences in wheelbase) to follow in a best fit path via independent physical, but electronically linked steering, acceleration, and braking controls.

Additionally, the tow bar system advantageously provides one or more of the following optional benefits over conventional trailer attachment: (a) additional angular tolerance for the connection eliminates the need for jacking or height adjustments on flat or angled ground; (b) optional selectable length adjustment combined with feature (a) eliminates the need for a precise distance between the two vehicles; (c) once the mechanical connections have been made the nominal length will be set and locked at the bar, or by moving one of the vehicles to the next locking point; (d) allowing for some compression travel within the tow bar will allow for latency between the lead vehicle initiating a braking event before the following vehicle can respond precisely. A relatively small amount of compressive travel will reduce the load on the two bar and any shock or bump that might be felt by the vehicle occupants; (e) allowing some extension travel provides the same benefits as feature (d) for acceleration and can also be used if it is desirable for the following vehicle to have a higher braking power to keep the connection in-line with the lead vehicle; (f) the structure of the tow bar can serve as a support for communications and power transfer harnesses between the lead and follow vehicles, though a wired connection may not be required if wireless technology is used; (g) optional measurement of the angle of the tow bar to the lead and follow vehicles could be used as a primary or back-up sensing to the onboard electronics of the lead and/or follow vehicles, while sensing angle directly at the tow bar can prevent jackknife/contact events while making low speed maneuvers in forward or reverse; (h) sensing the tensile and compressive loading present in the tow bar can provide a primary or secondary means of balancing or targeting a desired force during acceleration, cruising at steady speed and braking forces between the two vehicles; and (i) optional ability to lock the lateral pivoting of the tow bar at one end, which allows for the recovery of a following vehicle that may not have lost electrical power to maintain its independent steering operation or may have reduced braking performance. The lock could be set manually or while driving if a loss of power or function is detected.

In some examples, the tow bar system advantageously provides: spherical degrees of freedom at both ends of the tow bar, which allows active steering of the trailing vehicle, as opposed to flat towing where the front wheels of the tow vehicle must follow the path dictated by a rigid tow bar. The system also includes a powered trailer, which allows reversing maneuvers that are not possible with flat towing. Steering of the trailer is controlled electronically, allowing reverse movement without jackknifing, and left-right bias relative to the lead vehicle. The system supplies all or most of the pulling power needed to move the trailer with any lead vehicle, as enabled by a load cell in the tow bar. The system is a simply supported beam connection so the lead vehicle does not have to support the trailer's weight.

With continued reference to FIGS. 5-7, a tow bar system 200 for independently steered and powered trailers is illustrated. As shown in FIG. 5, the tow bar system 200 is configured to removably couple a trailing vehicle 202 (e.g., a trailer) to a lead vehicle 204. The trailing vehicle 202 includes a hitch receiver 206, and the lead vehicle includes a hitch receiver 208. As shown in FIG. 6, the tow bar system 200 generally includes a front tow bar 210 and a rear tow bar 212 coupled by a damper system 214. The tow bar system 200 is configured to support and route an electrical cable connection (not shown) between the lead and follow/tow vehicles, for example to provide signal communication (e.g., from sensors, cameras, etc.) or shared high voltage therebetween.

In the example embodiment, the front tow bar 210 is configured to removably couple to a hitch 220 received by the lead vehicle hitch receiver 208. As illustrated, the front tow bar 210 includes a load cell 216 and an angle sensor 218. The load cell 216 is configured to sense various forces on the tow bar system 200 including a trailer tongue weight, tension, and compression. The angle sensor 218 is configured to sense an angle between the lead vehicle 204 and a longitudinal axis of the front tow bar 210. The load cell 216 and the angle sensor 218 are in signal communication (e.g., wired, wireless) with a controller of the lead vehicle 204 and/or the trailing vehicle 202 (e.g., dolly system 10, trailer platform system 100). Such controllers may be part of an ADAS/automated driving system for that particular vehicle and utilize signals from the load cell 216 and angle sensor 218 to control one or more operations of the vehicles 202, 204.

The rear tow bar 212 is configured to removably couple to a hitch 234 received by the trailing vehicle hitch receiver 206. The rear tow bar 212 includes an angle sensor 230 and a length adjustment and locking mechanism 232. The angle sensor 230 is configured to sense an angle between the trailing vehicle 202 and the longitudinal axis of the rear tow bar 212. The angle sensor 230 is in signal communication (e.g., wired, wireless) with a controller of the lead vehicle 204 and/or the trailing vehicle 202 (e.g., dolly system 10, trailer platform system 100). Such controllers may be part of an ADAS/automated driving system for that particular vehicle and utilize signals from the angle sensor 230 to control one or more operations of the vehicles 202, 204.

In the example embodiment, the length adjustment and locking mechanism 232 generally includes a locking bar 240 extending between a forward bar 242 and a rearward bar 244. The locking bar 240 is rigidly coupled to the rearward bar 244 and is slidingly received within the forward bar 242. The locking bar 240 includes a plurality of axially spaced apertures 246 configured to selectively receive a pin 248 therein to lock-in the relative distance between the forward bar 242 and the rearward bar 244. The pin 248 is removable to allow sliding adjustment of the locking bar 240 to establish a desired length of the rear tow bar 212. It will be appreciated however that rear tow bar 212 may have any suitable alternative configuration that enables length adjustment of the rear tow bar 212, and such a length adjustment system may additionally or alternatively be utilized with the front tow bar 210.

In the example implementation, the damper system 214 is disposed between the front tow bar 210 and the rear tow bar 212 and generally includes a damper 250, a front support 252, a front biasing mechanism 254 (e.g., a spring), a rear support 256, and a rear biasing mechanism 258 (e.g., a spring).

The front support 252 includes a pair of spaced apart support bars or members 260 with first ends coupled to an end plate 262, and opposite second ends coupled to the damper 250. The end plate 262 is coupled to and/or disposed against the front tow bar 210. The front biasing mechanism 254 is disposed about a front guide post 264 and positioned between the end plate 262 and the damper 250. The front guide post 264 is integral with or rigidly coupled to the front tow bar 210 and extends through an aperture formed in the end plate 262. In one example embodiment, the front biasing mechanism 254 is an extension spring configured to bias the front tow bar 210 and damper 250 towards each other, and absorb tensile forces in the tow bar system 200. The damper 250 is a generally cylindrical damping member fabricated from a suitable damping material configured to absorb forces (e.g., tension, compression) experienced in the tow bar system 200 during towing operations.

The rear support 256 includes a pair of spaced apart support bars or members 270 with first ends coupled to the damper 250, and opposite second ends coupled to the rear tow bar 212, for example, via the illustrated pins 272. The second end of each support member 270 includes a window 274 configured to slidingly receive pin 272. In this way, pins 272 are configured to translate fore/aft within the windows 274. The rear biasing mechanism 258 is disposed about a rear guide post 276 and positioned between the damper 250 and the rear tow bar 212. The rear guide post 276 is integral with or rigidly coupled to the rear tow bar 212. In one example embodiment, the rear biasing mechanism 258 is a compression spring configured to bias apart the damper 250 and rear tow bar 212 and absorb compressive forces in the tow bar system 200.

FIG. 7 illustrates the tow bar system 200 with a horizontal lockout assembly 280 configured to lock out the lateral steering degree of freedom at one end of the tow bar if steering control is lost on the trailing vehicle 202. In this way, the horizontal lockout assembly 280 is configured to turn the tow bar system 200 into a rigid tow bar to prevent loss of lateral control.

In the example embodiment, the horizontal lockout assembly 280 generally includes a horizontal bar or member 282 and an angled bar or member 284. The horizontal member 282 includes a first end 286 coupled to the hitch 220 and an opposite second end 288. The angled member 284 includes a first end 290 and an opposite second end 292. The first end 290 is pivotally coupled to the horizontal member second end 288 via a pin 294, and the second end 292 is pivotally coupled to the front tow bar 210 via a pin 296. The angled member 284 includes a sliding joint 298 that enables a length of the angled member 284 to change to allow a full range of articulation of the tow bar system 200. If there is a loss of power and/or communication with the trailing vehicle 202, the sliding joint 298 is configured to lock and prevent loss of lateral control of the trailing vehicle 202.

In operation, the tow bar system 200 is configured to absorb harsh tensile and compressive loads that occur while steering, braking, and accelerating. Moreover, the length of tow bar system 200 is adjustable via the length adjustment and locking mechanism 232. The various sensors included with tow bar system 200 enable sensing of tensile/compressive loads as well as the angular difference between the tow bar and the lead and follow vehicles. This enables a self-powered, steering capable follow vehicle (e.g., dolly system 10, trailer platform system 100) to accelerate/decelerate, brake, and steer via human or autonomous control. As such, the tow bar system 200 enables a vehicle/trailer that may be mismatched in terms of turning radius to follow in a best fit path via independent physical, electronically linked steering, acceleration, and braking controls.

It will be appreciated that the term "controller" or "module" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A trailer platform system with independent propulsion and control, comprising:
    a steerable first axle connected to a pair of first wheels;
    a second axle connected to a pair of second wheels;
    at least one electric traction motor configured to drive the steerable first axle and/or the second axle;
    a high voltage battery system configured to power the at least one electric traction motor;
    a load platform supported by a chassis and a suspension, wherein the load platform is a wagon-style platform with the first and second wheels located at the four corners of the load platform; and
    a lead vehicle hitch connection configured to removably couple to a lead vehicle.

2. The trailer platform system of claim 1, further comprising an advanced driver assistance system (ADAS) or autonomous driving system having a controller in signal communication with a steer-by-wire module to control driving and/or operation of the trailer platform system.

3. The trailer platform system of claim 2, wherein the controller is in signal communication with one or more sensors and/or cameras, and
    wherein the controller is configured to steer, accelerate, and brake the trailer platform system, based on signals from the one or more sensors and/or cameras, such that the trailer platform system follows a lead vehicle path while avoiding obstacles and providing trailer stability control.

4. The trailer platform system of claim 2, wherein the ADAS or autonomous driving system is configured for signal communication and integration with an ADAS or autonomous driving system of the lead vehicle.

5. The trailer platform system of claim 2, wherein the controller is configured to provide a low-speed manual control mode of the trailer platform system via a control unit.

6. The trailer platform system of claim 5, wherein the control unit is a user interface of the lead vehicle.

7. The trailer platform system of claim 5, wherein the control unit is a user interface of the trailer platform system.

8. The trailer platform system of claim 5, wherein the control unit is an application on a mobile device.

9. The trailer platform system of claim 2, further comprising a wired connector configured to connect the ADAS or autonomous driving system to an ADAS or autonomous driving system of the lead vehicle for cooperative and integrated operation between the trailer platform system and the lead vehicle.

10. The trailer platform system of claim 2, wherein the ADAS or autonomous driving system is wirelessly connected to an ADAS or autonomous driving system of the lead vehicle for cooperative and integrated operation between the trailer platform system and the lead vehicle.

11. The trailer platform system of claim 1, wherein the suspension provides a ground force reaction for steering, acceleration, and braking to manage loading and clearance to the lead vehicle.

12. The trailer platform system of claim 1, further comprising a high voltage power connection to electrically couple the high voltage battery system to a high voltage battery system of the lead vehicle.

13. The trailer platform system of claim 1, wherein the second axle is a steerable second axle.

14. The trailer platform system of claim 1, further comprising a tow bar system to couple the lead vehicle hitch connection to the lead vehicle, the tow bar system comprising:
    a front tow bar configured to removably couple to a hitch of the lead vehicle;
    a rear tow bar configured to removably couple to the lead vehicle hitch connection; and
    a damper system disposed between the front tow bar and the rear tow bar and configured to absorb compressive and tensile loads occurring during steering, accelerating, and braking of the trailer platform system.

15. The trailer platform system of claim 14, wherein the tow bar system further comprises an angle sensor disposed on the front tow bar configured to sense an angle between the lead vehicle and the front tow bar, wherein the angle sensor is in signal communication with an advanced driver assistance system (ADAS) or automated driving system.

16. The trailer platform system of claim 14, wherein the tow bar system further comprises an angle sensor disposed on the rear tow bar configured to sense an angle between the load platform and the rear tow bar, wherein the angle sensor is in signal communication with an advanced driver assistance system (ADAS) or automated driving system.

17. The trailer platform system of claim 14, wherein the tow bar system further comprises a load cell configured to sense one or more forces on the tow bar system, wherein the load cell is in signal communication with an advanced driver assistance system (ADAS) or automated driving system.

\* \* \* \* \*